(12) United States Patent
Denis

(10) Patent No.: US 7,092,587 B1
(45) Date of Patent: Aug. 15, 2006

(54) MULTICHANNEL OPTICAL DEMULTIPLEXER WITH VARYING ANGLES OF INCIDENCE TO THE LIGHT BANDPASS FILTERS

(75) Inventor: Donald J. Denis, Barrie (CA)

(73) Assignee: Raytheon Company, Waltham, MA (US)

(*) Notice: Subject to any disclaimer, the term of this patent is extended or adjusted under 35 U.S.C. 154(b) by 201 days.

(21) Appl. No.: 10/222,467

(22) Filed: Aug. 16, 2002

(51) Int. Cl.
*G02B 6/12* (2006.01)
*H04J 14/02* (2006.01)

(52) U.S. Cl. .................. 385/14; 385/24; 385/129; 385/130; 385/131; 385/52; 398/83; 398/85

(58) Field of Classification Search ............ 385/24, 385/31, 42, 37, 14, 129, 130, 131, 52; 398/83, 398/84, 85, 82
See application file for complete search history.

(56) References Cited

U.S. PATENT DOCUMENTS

| | | | |
|---|---|---|---|
| 4,244,045 A | 1/1981 | Nosu et al. | 385/34 X |
| 4,904,043 A | 2/1990 | Schweizer | 385/33 X |
| 5,583,683 A | 12/1996 | Scobey | 385/24 X |
| 5,737,104 A | 4/1998 | Lee et al. | 359/124 |
| 5,889,904 A | 3/1999 | Pan et al. | 385/24 |
| 5,946,435 A | 8/1999 | Zheng et al. | 385/47 |
| 6,008,920 A | 12/1999 | Hendrix | 359/127 |
| 6,125,221 A | 9/2000 | Bergmann et al. | 385/33 |
| 6,208,440 B1 * | 3/2001 | Jang | 398/9 |
| 6,282,334 B1 * | 8/2001 | Hodgson et al. | 385/12 |
| 6,335,830 B1 | 1/2002 | Chang et al. | 359/498 |
| 6,337,770 B1 | 1/2002 | Chang et al. | 359/495 |
| 6,532,115 B1 * | 3/2003 | Holmes | 359/722 |
| 6,563,976 B1 * | 5/2003 | Grann et al. | 385/24 |
| 6,567,586 B1 | 5/2003 | Brophy et al. | 385/33 |

* cited by examiner

*Primary Examiner*—Brian M. Healy
(74) *Attorney, Agent, or Firm*—William C. Schubert; Karl A. Vick

(57) ABSTRACT

An optical demultiplexer includes a first light bandpass filter that receives an input light beam at a first angle of incidence, passes a first light wavelength, and reflects a reflected beam, and a second light bandpass filter that receives the reflected beam at a second angle of incidence and passes a second light wavelength. A beam redirection element such as a reflective surface receives the reflected beam from the first light bandpass filter and redirects the reflected beam toward the second light bandpass filter at the second angle of incidence.

5 Claims, 3 Drawing Sheets

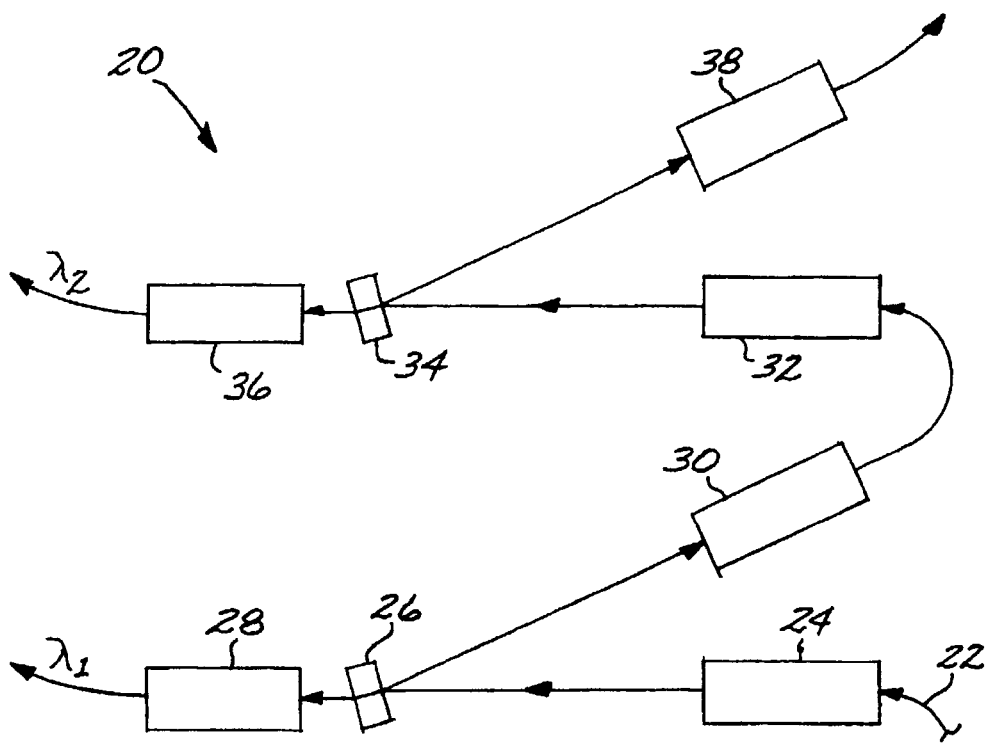
FIG. 1 PRIOR ART
FIG. 2
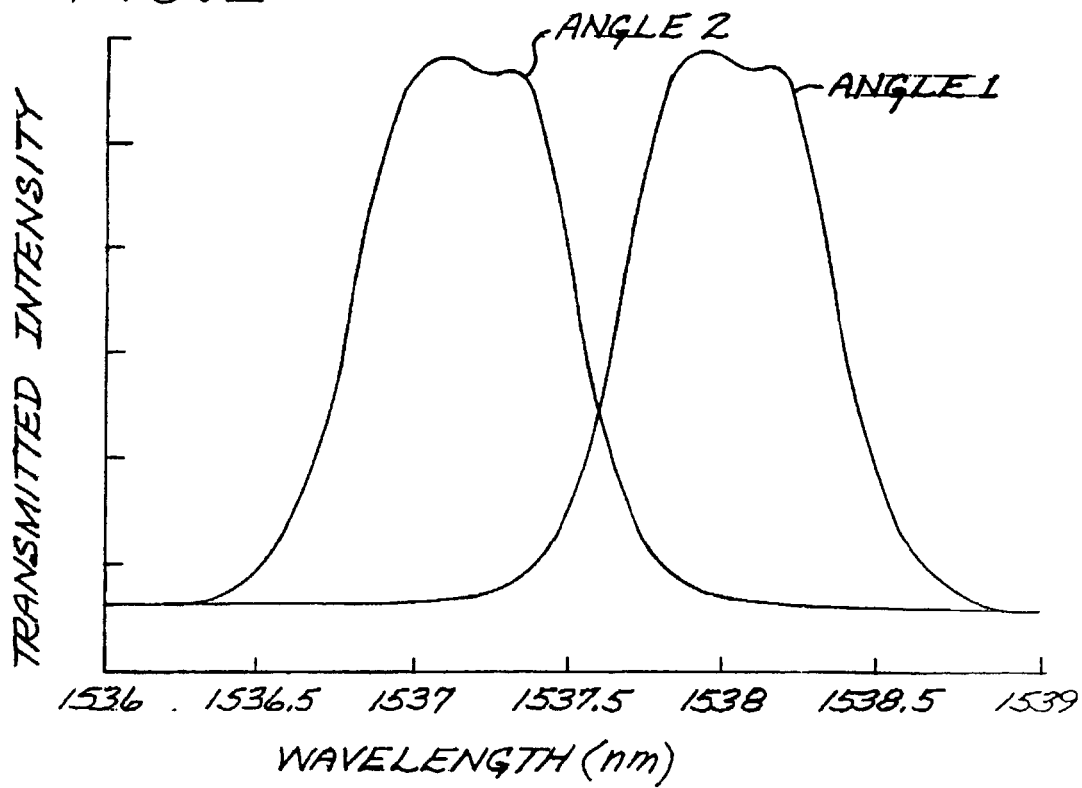

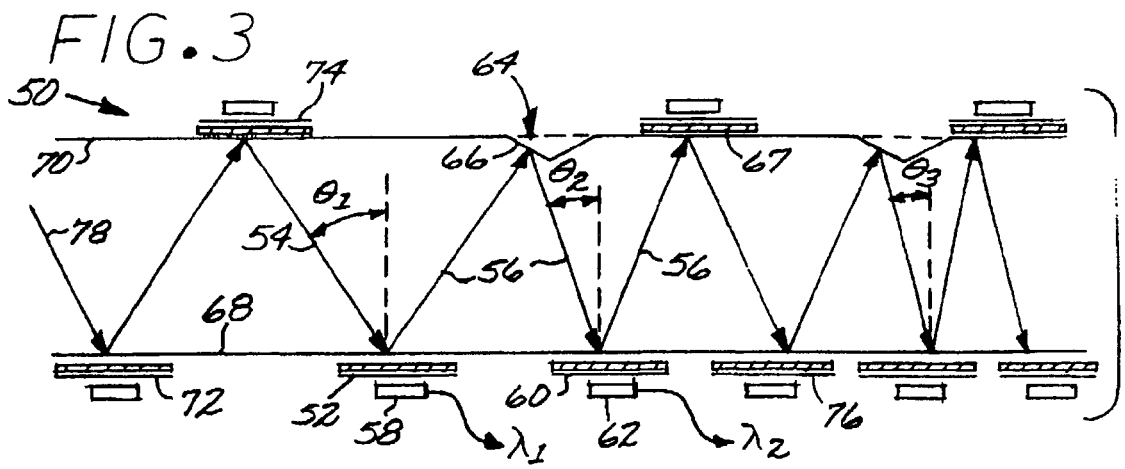
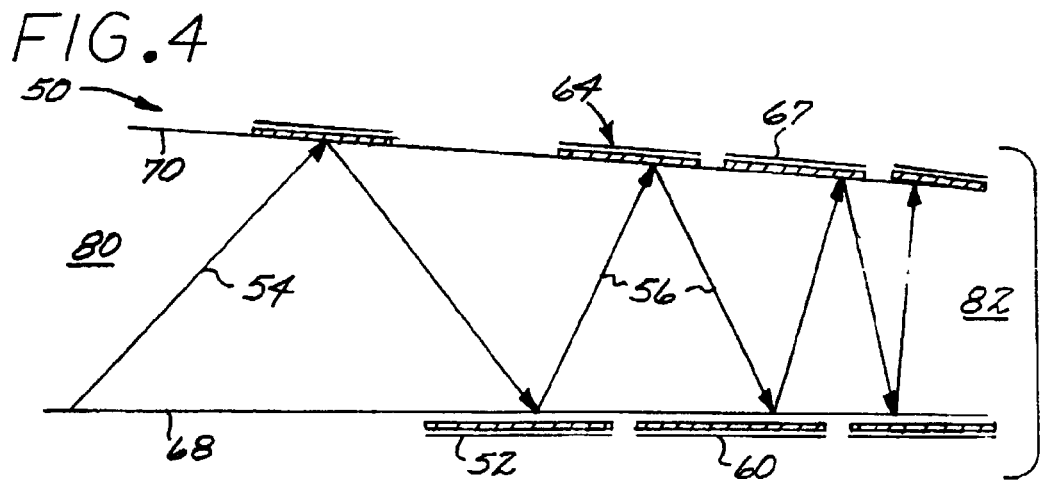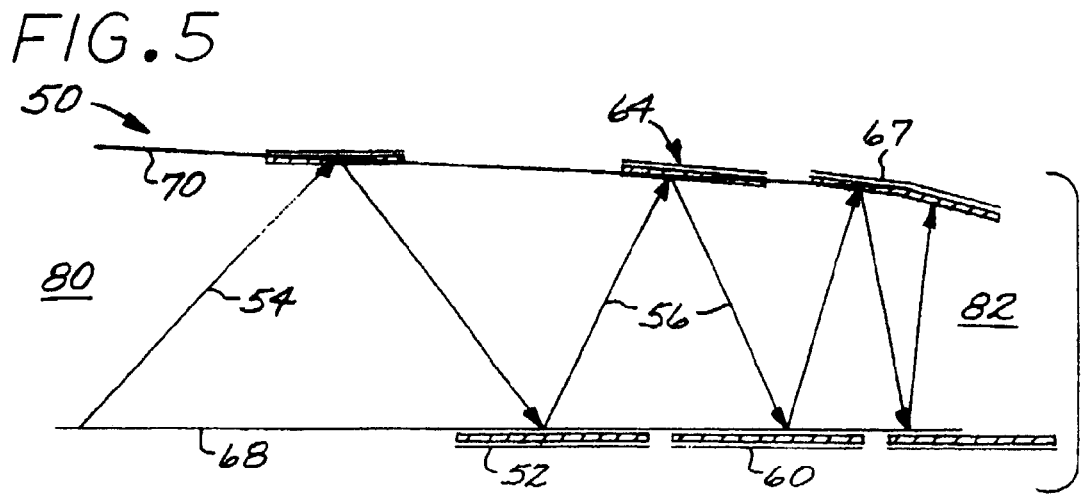

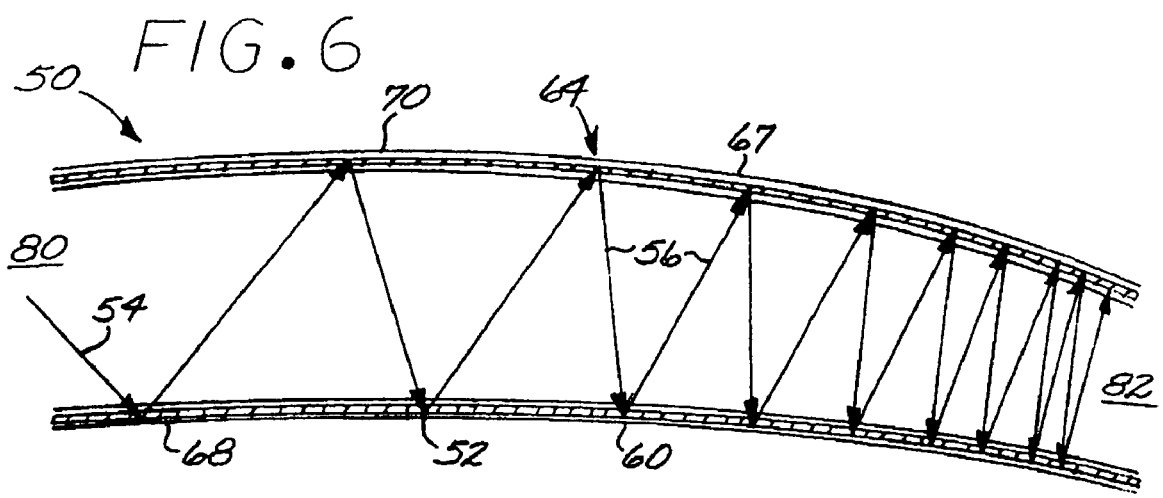
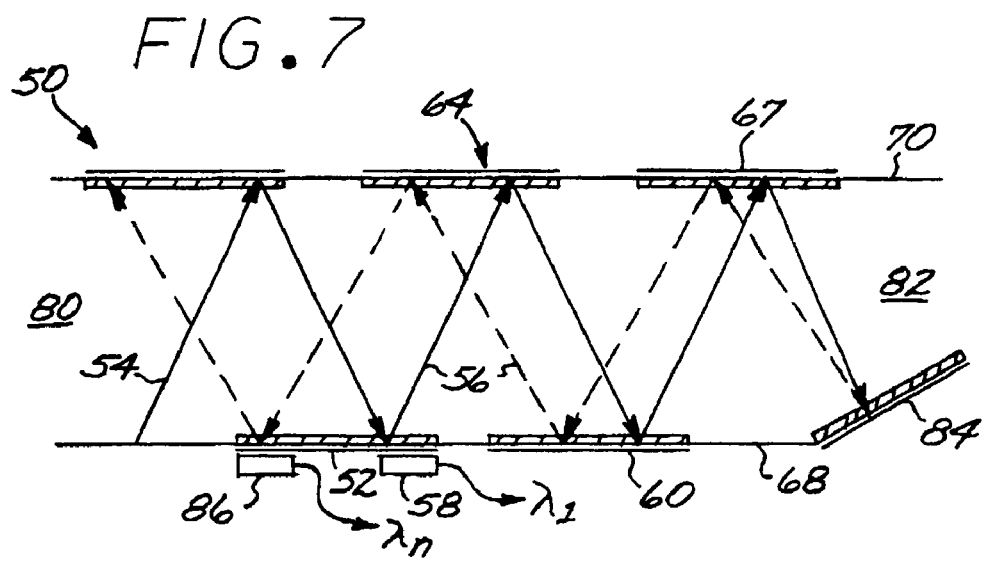

MULTICHANNEL OPTICAL DEMULTIPLEXER WITH VARYING ANGLES OF INCIDENCE TO THE LIGHT BANDPASS FILTERS This invention relates to optical communications and more particularly, to an optical demultiplexer used in an optical communications system.

BACKGROUND OF THE INVENTION

In an optical communications system, information is encoded onto a light signal. The light signal is transmitted from one point to another, as for example by free-space light beams or optical fibers. At the receiving end, the information is read from the light signal.

An important advantage of optical communications is that a number of different light signals of different wavelengths may be mixed together (multiplexed) into a single light beam in a technique known as wavelength division multiplexing (WDM). Each light signal of a different wavelength, or channel, has information encoded onto it prior to the mixing of the channels. At the receiving end, the channels are separated, or demultiplexed, according to their wavelengths. The information on each channel is read from the demultiplexed light of that wavelength. A single multiplexed light beam may therefore carry many times the information that may be transmitted by a non-multiplexed light beam.

The demultiplexing may be accomplished using a series of light bandpass filters. A thin-film optical filter of this type is formed as a substrate and a multilayer dielectric light-transmissive optical stack deposited upon the substrate. The bandpass filter transmits only light of a specific wavelength. When a multichannel beam is incident upon the filter, the light channel associated with the bandpass range is transmitted through the filter to a light receiver behind the filter. The beam with the remaining channels is reflected to another filter, where the next channel is extracted from the beam in a similar fashion, and so on until all of the channels of information carried by the light beam have been separated for further individual processing.

As the number of channels transmitted on a light beam increases, the required number of different constructions of the demultiplexing bandpass filters increases in order to extract each of the different channels from the light beam. The demultiplexing structure therefore becomes increasingly more costly due to the large numbers of different types of light bandpass filters that must be constructed and tested. There is accordingly a need for an approach which accomplishes the demultiplexing in a more convenient and less costly manner, particularly for large numbers of channels carried on the light beam. The present invention fulfills this need, and further provides related advantages.

SUMMARY OF THE INVENTION

The present invention provides an optical demultiplexer that uses a smaller number of light bandpass filter constructions than the number of channels being processed. The approach allows the use of more densely packed channels than heretofore possible, most significantly by reusing each construction or type of filter for more than one channel.

In accordance with the invention, an optical demultiplexer comprises a first light bandpass filter that receives an input light beam at a first angle of incidence, passes a first light wavelength, and reflects a reflected beam, and a second light bandpass filter that receives the reflected beam at a second angle of incidence and passes a second light wavelength. Each of the light bandpass filters preferably comprises a substrate and a multilayer dielectric light-transmissive optical stack deposited upon the substrate. A beam redirection element receives the reflected beam from the first light bandpass filter and redirects the reflected beam toward the second light bandpass filter at the second angle of incidence. Preferably, a first light receiver is positioned to receive the light of the first light wavelength after it passes through the first light bandpass filter, and a second light receiver is positioned to receive the light of the second light wavelength after it passes through the second light bandpass filter.

The beam redirection element is preferably a reflective surface. The reflective surface may be, for example, one of the bandpass filters, a third light bandpass filter that passes a third light wavelength and reflects the reflected beam, a mirror, a collimator-fiber loop, or the like.

The first light bandpass filter and the second light bandpass filter may be the same construction or different constructions.

The approach of the invention may be implemented in any of a number of embodiments. In one approach, the optical demultiplexer further includes a first alignment reference surface and a second alignment reference surface. Exactly two of the first light bandpass filter, the second light bandpass filter, and the beam redirection element are positioned relative to the first alignment reference surface and exactly one of the first light bandpass filter, the second light bandpass filter, and the beam redirection element is positioned relative to the second alignment reference surface. The first alignment reference surface and the second alignment reference surface may be planar and parallel to each other or not parallel to each other. Alternatively, one of the first alignment reference surface and the second alignment reference surface may be curved and the other is planar. Alternatively, both the first alignment reference surface and the second alignment reference surface may be curved.

In another embodiment, the first light bandpass filter comprises one of a first set of light bandpass filters, each of which passes a different wavelength of light at the first angle of incidence, and the second light bandpass filter comprises one of a second set of light bandpass filters, each of which passes a different wavelength of light at the second angle of incidence. In this embodiment, the beam redirection element preferably is a mirror disposed between the first set of light bandpass filters and the second set of light bandpass filters. Desirably in this embodiment, all of the first set of light bandpass filters are of the same construction, and all of the second set of light bandpass filters are of the same construction (but different from the construction of the first set of light bandpass filters).

The present invention is based upon a recognition that the bandpass wavelength of the light bandpass filter is dependent upon the angle of incidence of the light beam upon the light bandpass filter. One channel at one wavelength is extracted by directing the light beam onto the first light bandpass filter at the first angle of incidence, and the next channel is extracted by redirecting the beam (with the first channel removed) onto the second light bandpass filter at the second angle of incidence. The number of constructions or types of light bandpass filters required for a demultiplexer is thereby reduced, in some cases to only one construction of light bandpass filter.

The present invention thus provides an optical demultiplexer, which according to optics principles, may be used as a multiplexer as well. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a schematic drawing of a conventional demultiplexer system;

FIG. 2 is a schematic graph of the transmission of a light bandpass filter as a function of wavelength, for two angles of incidence;

FIG. 3 is a schematic plan view of a first embodiment of an optical demultiplexer according to the invention;

FIG. 4 is a schematic plan view of a second embodiment of an optical demultiplexer according to the invention;

FIG. 5 is a schematic plan view of a third embodiment of an optical demultiplexer according to the invention;

FIG. 6 is a schematic plan view of a fourth embodiment of an optical demultiplexer according to the invention; and FIG. 7 is a schematic plan view of a fifth embodiment of an optical demultiplexer according to the invention.

DETAILED DESCRIPTION OF THE INVENTION

FIG. 1 depicts a conventional demultiplexer 20 for extracting light of a first wavelength $\lambda_1$ and light of a second wavelength $\lambda_2$ from an incoming light beam 22. The demultiplexer 20 includes a first transmitter 24 that directs the light beam 22 onto a first light bandpass filter 26. The light of wavelength $\lambda_1$ passes through the first light bandpass filter 26 and is received by a first light receiver 28. The remainder of the beam reflects from the first light bandpass filter 26, is received by a first collimator 30, and is conveyed to a second transmitter 32. The beam is transmitted to a second light bandpass filter 34, where the light of wavelength $\lambda_2$ is passed through to a second light receiver 36, and the remainder of the beam is reflected from the second light bandpass filter to a second collimator 38. This process is repeated for each of the wavelengths of light to be extracted from the light beam 22, with a suitable light bandpass filter provided for each wavelength that is extracted.

The present invention uses such a light bandpass filter but in another manner. Such light bandpass filters are known in the art for other uses and include, for example, thin-film filters having a substrate and a multilayer dielectric light-transmissive optical stack deposited upon the substrate, and also diffraction grating filters. See, for example, U.S. Pat. Nos. 4,244,045 and 5,583,683, whose disclosures are incorporated by reference. For such light bandpass filters, the transmitted light intensity as a function of wavelength is dependent upon the angle of incidence of the light beam to the surface of the light bandpass filter. The example shown in FIG. 2 illustrates this property of the light bandpass filters. In this example, the transmitted intensity for light incident at Angle 1 is a maximum at about 1538 nanometers (nm) wavelength. The transmitted intensity for light incident at Angle 2 is a maximum at about 1537 nanometers. By directing a light beam toward the filter surface at Angle 1, the light of about 1538 nanometers wavelength is passed through the filter to a receiver on the other side of the light bandpass filter. The light not transmitted is reflected, and then may be directed toward the filter surface at Angle 2. The light of about 1537 nanometers wavelength is passed through the filter to a second receiver on the other side of the light bandpass filter. The process may be repeated for additional wavelengths of light.

FIGS. 3–7 illustrate five embodiments of optical demultiplexers 50 that utilize this principle. For clarity of illustration, these embodiments are presented with a two-dimensional, planar light path. These embodiments, and others as well, may instead have a three-dimensional, nonplanar light path as long as the other geometrical conditions and relationships discussed herein are maintained.

Referring to FIG. 3, an optical demultiplexer 50 includes a first light bandpass filter 52 that receives an input light beam 54 at a first angle of incidence $\theta_1$. The first light bandpass filter 52 passes a first light wavelength $\lambda_1$, and reflects a reflected beam 56 (without the light signal of wavelength $\lambda_1$. A first light receiver 58 is positioned to receive the light of the first light wavelength $\lambda_1$ after it passes through the first light bandpass filter 52 and outputs a signal responsive to the signal carried by the first light wavelength $\lambda_1$.

A second light bandpass filter 60 receives the reflected beam 56 at a second angle of incidence $\theta_2$. In this case, the second light bandpass filter 60 is of a different construction than the first light bandpass filter 52. That it, it utilizes a different optical stack on the substrate. The second light bandpass filter 60 passes a second light wavelength $\lambda_2$ and reflects the reflected beam 56 (but without the light signals of wavelengths $\lambda_1$ and $_2$). A second light receiver 62 is positioned to receive the light of the second light wavelength $\lambda_2$ after it passes through the second light bandpass filter 60 and outputs a signal responsive to the signal carried by the second light wavelength $\lambda_2$.

A beam redirection element 64, here depicted as a reflective surface and specifically a mirror 66, receives the reflected beam 56 from the first light bandpass filter 52. The mirror 66 redirects the reflected beam 56 toward the second light bandpass filter 60 at the second angle of incidence $\theta_2$. This redirection is accomplished by positioning the mirror 66 at the proper angle.

The reflected beam 56 that reflects from the second light bandpass filter 60 is incident upon a third light bandpass filter 67 at the angle of incidence $\theta_2$. The second light bandpass filter 60 thus serves as the beam redirection element for the third light bandpass filter 67. The third light bandpass filter 67 passes a third light wavelength and reflects the remaining portion of the reflected beam 56. The continued bandpass and reflection of light continues down the length of the optical demultiplexer 50.

In the embodiment of FIG. 3, the optical demultiplexer 50 further includes a first alignment reference surface 68, and a second alignment reference surface 70. As used herein, the alignment reference surfaces may be physical surfaces to which optical elements may be physically attached or they may be nonphysical reference constructs for reference purposes only, but in each case they provide a reference through which the locations and orientations of the various optical elements may be related and compared. In the case of the embodiment of FIG. 3, the alignment reference surfaces 68 and 70 are each planar and are parallel to each other. Exactly two of the first light bandpass filter 52, the second light bandpass filter 60, and the beam redirection element 64 are positioned relative to, and in this case mounted to, the first alignment reference surface 68. Exactly one of the first light bandpass filter 52, the second light bandpass filter 60, and the beam redirection element 64 are positioned relative to, and in this case mounted to, the second alignment reference surface 70. In this case, the first light bandpass filter 52 and the second light bandpass filter 60 are mounted to the first alignment reference surface 68 so that their surfaces are parallel to the first alignment reference surface 68, and the beam redirection element 64 is mounted to the second alignment reference surface 70 at a known angle relative thereto.

In the depicted embodiment of FIG. 3, the first light bandpass filter 52 comprises one of a first set of light bandpass filters 52, 72, and 74. Each of these bandpass filters 52, 72, and 74 is of a different optical stack construction which passes a different wavelength of light at the first angle of incidence $\theta_1$. The second light bandpass filter 60 comprises one of a second set of light bandpass filters 60, 67, and 76. The beam redirection element 64 is positioned between the first set of light bandpass filters 72, 74, and 52, and the second set of light bandpass filters 60, 67, and 76. Each of these bandpass filters 60, 67, and 76 is of a different optical stack construction that passes a different wavelength of light at the second angle of incidence $\theta_2$. Preferably, the first light bandpass filters of each of the two sets, the light bandpass filters 72 and 60, are of the same construction; the second light bandpass filters of the two sets, the light bandpass filters 74 and 67, are of the same construction; and the third light bandpass filters of the two sets, the light bandpass filters 52 and 76, are of the same construction. The light wavelengths carried by the initial light beam are selected such that the first three channels are extracted from the light beam by the first set of light bandpass filters 72, 74, and 52 at the first angle of incidence $\theta_1$, and the second three channels are extracted from the light beam by the second set of light bandpass filters 60, 67, and 76 at the second angle of incidence $\theta_2$. This principle is continued to additional sets of light bandpass filters. Consequently, all of the light channels may be extracted from the light beam using only three different constructions of the light bandpass filters, a considerable savings in fabrication cost and complexity. In this illustration, there are three light bandpass filters in each set, but there may be more or fewer.

FIGS. 4–7 depict other embodiments of the optical demultiplexer 50. Corresponding components are assigned the same reference numerals as in the prior embodiment, and the above discussion of the FIG. 3 embodiment is incorporated to the extent applicable. The light receivers are omitted from FIGS. 4–7, with the understanding that they are present and functioning to receive the light wavelengths passed through their respective light bandpass filters.

In the embodiment of FIG. 4, the two alignment reference surfaces 68 and 70 are each planar but are not parallel to each other. Instead, the two alignment reference surfaces 68 and 70 converge from an input end 80 of the optical demultiplexer 50 toward an output end 82, and the surfaces of the light bandpass filters are parallel to the respective reference surfaces 68 and 70. This convergence accomplishes a continuing change in the angle of incidence of the light beam on each successive light bandpass filter. With this "loose channel spacing" approach, filters of slightly different ITU channel offsets may be selected to match the required ITU channel at the angle of incidence of the position of bonding (inasmuch as the angle of incidence at each location is known from the geometry). Using this approach, filters that are slightly off specification, and which would otherwise be discarded, may be used in the optical demultiplexer 50.

In the embodiment of FIG. 5, the first alignment reference surface 68 is planar and the second alignment reference surface 70 is piecewise planar and segmented between the planar portions. This embodiment uses "specific channel spacings" with each filter bandpass centered on the ITU channel+(offset+/−deviation), where the offset is the same for all of the filters. The filters are positioned at non-planar angles to match (or be tuned to) each subsequent ITU channel.

In the embodiment of FIG. 6, the alignment reference surfaces 68 and 70 are both curved and converging from the input end 80 of the optical demultiplexer 50 toward the output end 82. FIG. 6 illustrates an alternative construction for the optical bandpass filters. In this case, one or both of the entire alignment reference surfaces 68 and 70 is of the dielectric stack construction, rather than using discrete optical bandpass filters. Where only one of the alignment reference surfaces 68 and 70 is of the dielectric stack construction, the other of the alignment reference surfaces is a light-reflective surface.

In the embodiment of FIG. 7, a reversal mirror 84 is positioned at the end 82 of the optical demultiplexer 50 to reflect the light beam back through the structure of optical components. The light beam therefore is incident upon each light bandpass filter twice, once when propagating from left to right in FIG. 7, and once when propagating from right to left in FIG. 7 after reflecting from the reversal mirror 84. The two light beams are incident upon each respective light bandpass filter with slightly different angles of incidence. Two light receivers are provided at each of the light bandpass filters. For example, at the first light bandpass filter 52, in addition to the first light receiver 58, there is a reversal light receiver 86 that receives the light transmitted through the first light bandpass filter 52 after reflection from the reversal mirror 84. Different wavelengths of light reach the first light receiver 58 and the reversal light receiver 86, because the angles of incidence of the light beam on the first light bandpass filter 52 are different.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An optical demultiplexer comprising:
   a first light bandpass filter that receives an input light beam at a first angle of incidence, passes a first light wavelength, and reflects a reflected beam;
   a second light bandpass filter that receives the reflected beam at a second angle of incidence and passes a second light wavelength, wherein the second angle of incidence is different from the first angle of incidence;
   a beam redirection element that receives the reflected beam from the first light bandpass filter and redirects the reflected beam toward the second light bandpass filter at the second angle of incidence;
   a first alignment reference surface, wherein exactly two of the first light bandpass filter, the second light bandpass filter, and the beam redirection element are positioned relative to the first alignment reference surface; and
   a second alignment reference surface, wherein exactly one of the first light bandpass filter, the second light bandpass filter, and the beam redirection element is positioned relative to the second alignhment reference surface, wherein the first alighment reference surface and the second alignment reference surface are planar but not parallel to each other.

2. An optical demultiplexer comprising:
   a first light bandpass filter that receives an input light beam at a first angle of incidence, passes a first light wavelength, and reflects a reflected beam;

a second light bandpass filter that receives the reflected beam at a second angle of incidence and passes a second light wavelength, wherein the second angle of incidence is different from the first angle of incidence;

a beam redirection element that receives the reflected beam from the first light bandpass filter and redirects the reflected beam toward the second light bandpass filter at the second angle of incidence;

a first alignment reference surface, wherein exactly two of the first light bandpass filter, the second light bandpass filter, and the beam redirection element is positioned relative to the second alignment reference surface, wherein both the first alignment reference surface and the second alignment reference surface are nonplanar.

3. An optical demultiplexer comprising:

a first light bandpass filter that receives an input light beam at a first angle of incidence, passes a first light wavelength, and reflects a reflected beam, wherein the first light bandpass filter comprises one of a first set of light bandpass filters, each of which passes a different wavelength of light at the first angle of incidence;

a second light bandpass filter that receives the reflected beam at a second angle of incidence and passes a second light wavelength, wherein the second angle of incidence is different from the first angle of incidence, and wherein the second light bandpass filter comprises one of a second set of light bandpass filters, each of which passes a different wavelength of light at the second angle of incidence; and a beam redirection element that receives the reflected beam from the first light bandpass filter and redirection the reflected beam toward the second light bandpass filter at the second angle of incidence.

4. The optical demultiplexer of claim 3, wherein the beam redirection element is a mirror disposed between the first set of light bandpass filters and the second set of light bandpass filters.

5. The optical demultiplexer of claim 3, wherein all of the first set of light bandpass filters are of the same construction, and all of the second set of light bandpass filters are of the same construction.

* * * * *